(12) United States Patent
Haque

(10) Patent No.: US 7,653,242 B2
(45) Date of Patent: Jan. 26, 2010

(54) DYNAMICALLY ADJUSTING AND PREDICTING IMAGE SEGMENTATION THRESHOLD

(75) Inventor: Jamal Haque, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 731 days.

(21) Appl. No.: 11/273,779

(22) Filed: Nov. 15, 2005

(65) Prior Publication Data

US 2007/0160286 A1 Jul. 12, 2007

(51) Int. Cl.
*G06K 9/34* (2006.01)
*H04N 1/40* (2006.01)

(52) U.S. Cl. ........................ 382/173; 382/164; 358/3.22

(58) Field of Classification Search ................. 382/173, 382/164; 358/3.22
See application file for complete search history.

(56) References Cited

U.S. PATENT DOCUMENTS

| 2003/0149356 A1* | 8/2003 | Wei et al. ..................... 600/425 |
| 2005/0069207 A1* | 3/2005 | Zakrzewski et al. ......... 382/190 |
| 2005/0100213 A1* | 5/2005 | Qi et al. ....................... 382/170 |

* cited by examiner

*Primary Examiner*—Bhavesh M Mehta
*Assistant Examiner*—Bernard Krasnic
(74) *Attorney, Agent, or Firm*—Fogg & Powers LLC

(57) ABSTRACT

A method of dynamically adjusting and predicting a segmentation threshold is provided. The method comprises calculating a threshold factor, calculating an actual average image pixel intensity for an entire image frame, and predicting a future average image pixel intensity for future time t, wherein the predicted future average image pixel intensity is based on past actual average image pixel intensities. The method also comprises combining the predicted future average image pixel intensity with the threshold factor to provide an adaptive threshold that adapts to changes in pixel intensity due to movement of an object in the image frame.

15 Claims, 2 Drawing Sheets

DYNAMICALLY ADJUSTING AND PREDICTING IMAGE SEGMENTATION THRESHOLD

BACKGROUND

Image segmentation is the process of dividing an image into two or more regions based on given criteria. Often it is desirable to segment an image in order to separate an object of interest from background images. For example, image based tracking devices, such as self-steering vehicles, etc., need to separate an object of interest from the background images. Many methods exist for segmenting an image. One such method is known as thresholding.

Thresholding labels individual pixels as object pixels or background pixels based on the pixel intensity in relation to a set threshold. The accuracy of such a method depends on how well the threshold is selected. Various methods for determining a threshold value are commonly used. Although, the various methods have varying degrees of accuracy, these existing methods typically only produce accurate thresholds for static images. They do not accurately incorporate the changes in image pixel intensity due to movement of the object of interest toward or away from the camera. The ability to accurately incorporate movement of the object of interest toward or away from the camera is of particular importance in image tracking devices such as self-steering vehicles and missiles.

For the reasons stated above, and for other reasons stated below which will become apparent to those skilled in the art upon reading and understanding the present specification, there is a need in the art for improvements in segmenting of an image of a moving object.

SUMMARY

The above-mentioned problems and other problems are resolved by the present invention and will be understood by reading and studying the following specification.

In one embodiment, a method of dynamically adjusting and predicting a segmentation threshold is provided. The method comprises calculating a threshold factor, calculating an actual average image pixel intensity for an entire image frame, and predicting a future average image pixel intensity for future time t, wherein the predicted future average image pixel intensity is based on past actual average image pixel intensities. The method also comprises combining the predicted future average image pixel intensity with the threshold factor to provide an adaptive threshold that adapts to changes in pixel intensity due to movement of an object in the image frame.

In another embodiment, an image processing system is provided. The system comprises one or more sensor for gathering image data and a processing unit coupled to the one or more sensors for processing the image data to calculate a dynamic image segmentation threshold by combining a threshold factor with a predicted average image pixel intensity, I-all, for future time t.

In another embodiment, a computer readable medium having computer-executable instructions for performing a method of dynamically adjusting and predicting a segmentation threshold is provided. The method comprises receiving image frame data, calculating a threshold factor based on the image frame data, and averaging the pixel intensity for substantially all the pixels in the image frame to obtain an actual average pixel intensity for the entire image frame. The method also comprises performing a predictive filter algorithm on the image data to obtain a predicted future average pixel intensity for the entire image frame at future time t, wherein the predictive filter algorithm uses past actual average pixel intensities to predict a future average pixel intensity. The method further comprises combining the threshold factor and the predicted future average pixel intensity for future time t to produce an adaptive segmentation threshold, and providing an output of the adaptive segmentation threshold to a processor for segmenting the image frame data using the adaptive segmentation threshold.

In yet another embodiment, an image processing system is provided. The method comprises means for collecting image frame data, and means for calculating a threshold factor and a predicted average image pixel intensity coupled to the means for collecting image frame data, wherein a combination of the threshold factor and the predicted average image pixel intensity produces an adaptive segmentation threshold.

DRAWINGS

DETAILED DESCRIPTION

Figure 1:
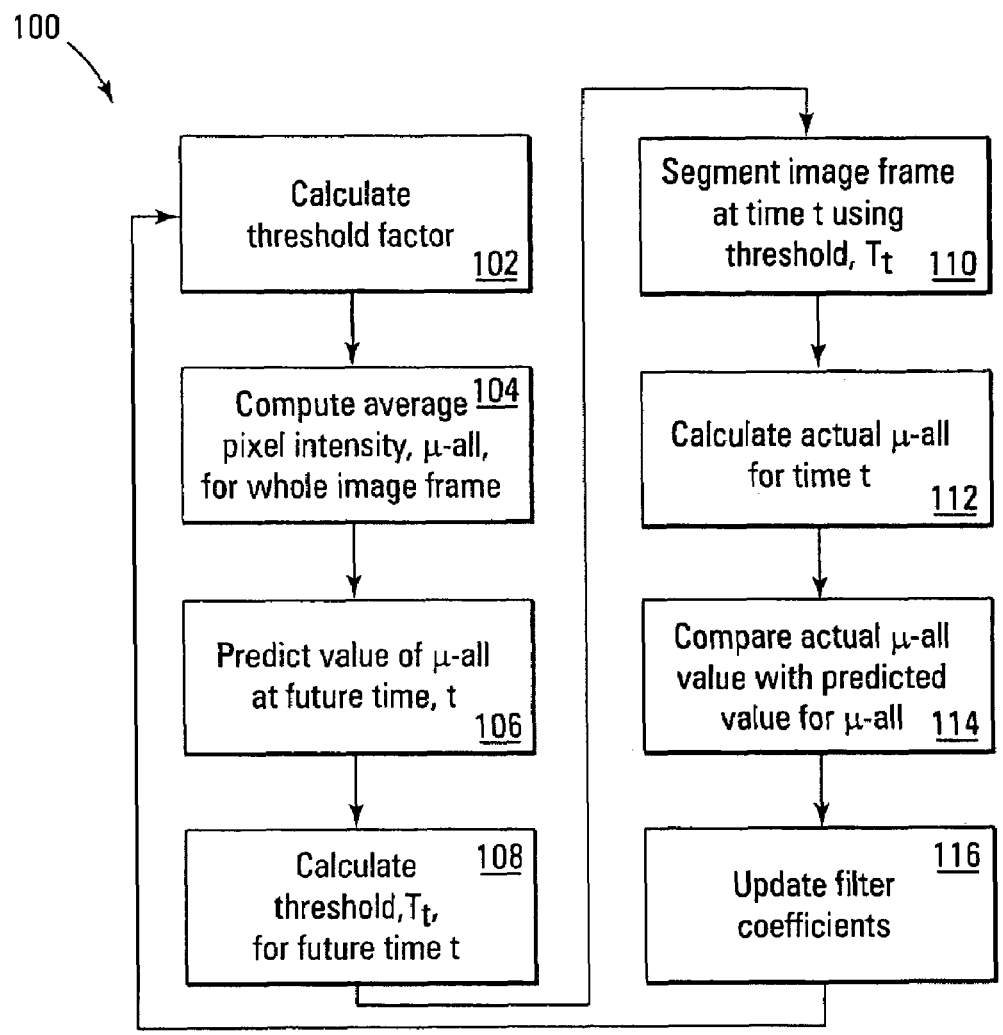
FIG. 1 is a flowchart showing a method of dynamically adjusting an image segmentation threshold according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps or may be performed in the context of a larger processing scheme. Furthermore, the methods presented in the drawing figures or the specification are not to be construed as limiting the order in which the individual steps may be performed. The following detailed description is, therefore, not to be taken in a limiting sense.

Embodiments of the present invention enable the incorporation of image pixel intensity changes due to movement of an object of interest toward or away from a camera in the calculation of an image segmentation threshold. Hence, embodiments of the present invention enable more accurate segmentation of an object of interest from background images in an image frame since changes in pixel intensity due to movement of an object of interest is included in the calculation of an image segmentation threshold. As a result, embodiments of the present invention enable many devices, such as image tracking devices, to operate more effectively in relation to the object being tracked.

FIG. 1 is a flowchart showing a method 100 of dynamically adjusting an image segmentation threshold according to one embodiment of the present invention. At 102, a threshold factor is calculated. The threshold factor is calculated using techniques known to one of skill in the art. For example in one embodiment, N regions are selected from an image frame. A mean pixel intensity and standard deviation are calculated for each of the N regions. Pixel intensities describe how bright a pixel is. In some embodiments, grayscale images are used. For 8 bits per sample grayscale images, the pixel intensity is a single number between 0 and 255, where 0 represents black, 255 represents white, and values in between represent shades of gray. In other embodiments, color images are used. For color images, a vector of a plurality of numbers are typically used to represent the brightness of color components in the pixel. In some such embodiments, an algorithm is run separately for each color. For example, in some embodiments, the RGB value is used in which three separate numbers represent the red, green and blue components of the pixel. In other embodiments the CMYK values are used in which four separate numbers representing the cyan, magenta, yellow and black components of a pixel. Various means are used in different embodiments for defining and determining the pixel intensity of individual pixels.

The mean pixel intensities and standard deviations of the N regions are then averaged. This average of the mean pixel intensities is calculated by at least one of summing the N individual pixel intensity averages and dividing by N and weighting each of the individual pixel intensity averages and summing the weighted averages. Additionally, the standard deviations are averaged similarly and added to the average of the mean pixel intensities. In other embodiments, other techniques for calculating a threshold factor are used, such as entropy based thresholding. Techniques for calculating a threshold factor, such as the example above, improve the final threshold value by accounting for areas of noise in the image frame. Noise or extreme pixel intensity values are better balance by such techniques than by averaging pixel intensities over the entire image frame.

At 104, an actual average pixel intensity, μ-all, is calculated for the image frame as a whole rather than for individual regions. As an object moves away from or toward the sensor, the average pixel intensity μ-all will change. The primary source for this change is the movement of the object. Although, an average pixel intensity, μ-all, for the image frame as a whole does not account for noise and extreme values as well as other techniques, such as regional averages, the average over the whole frame better reflects movement of the object away from or toward a sensor. At 106, the average pixel intensity, μ-all, is processed through an adaptive predictive filter which produces a predicted value for μ-all at future time, t. In some embodiments, the predicted value is based on past actual values of μ-all. For example, in one embodiment, the 5 previous actual values of μ-all are used to estimate the value of μ-all at future time, t. In other embodiments, other numbers of previous actual values of μ-all are used. The predicted average image pixel intensity enables embodiments of the present invention to adapt to changes in the image pixel intensity due to movement of the object being targeted. For example, after an average image pixel intensity is calculated for a given image frame, the object has already moved. Hence, by predicting an average image pixel intensity for a future time t and using that predicted value at time t to set the segmentation threshold, embodiments of the present invention adapt to movement of the object and more accurately segment the image frame with a moving object at time t using a final threshold value. Furthermore, availability of a predicted threshold value enables quicker segmentation of an object, thus reducing latency in the image processing chain of algorithms and enables faster decision making. This is particularly advantageous for fast moving tracking systems.

At 108, a final threshold value, $T_t$, for use at future time, t, is calculated by combining the threshold factor with the predicted value of μ-all from 106. In some embodiments, the threshold factor and predicted μ-all are combined by averaging the two values. In other embodiments, the threshold factor and predicted μ-all are weighted and then added together. In some embodiments, the weights applied to the two values are based on criteria such as rate of change in the overall pixel intensity, the average standard deviation of the N regions, etc. At 110, image frame data received at time t is segmented using segmentation threshold $T_t$. By calculating threshold $T_t$ based on a predicted value for time t, threshold $T_t$ is improved because it anticipates and adapts to changes in the pixel intensity of the image frame due to movement of the object being selected.

At 112, the actual value of μ-all at time t is calculated. At 114, the actual value of μ-all at time t is compared to the predicted value of μ-all to determine any error in the predicted value. At 116, filter coefficients of the adaptive predictive filter are updated based on the error determined at 114. In some embodiments, a Least Mean Squares (LMS) algorithm is used to determine the updated filter coefficients. The process then repeats starting at 102 where a new threshold factor threshold is calculated based on new image frame data received.

Figure 2:
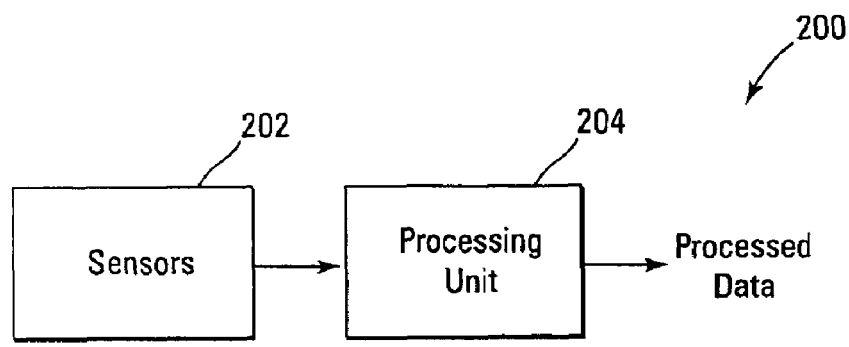
FIG. 2 is a block diagram of an image processing system for dynamically adjusting an image segmentation threshold according to one embodiment of the present invention.

FIG. 2 is a block diagram of an image processing system 200 for dynamically adjusting an image segmentation threshold according to one embodiment of the present invention. Image processing system 200 includes sensors 202 for retrieving image frame data. Sensors 202 include, but are not limited to, infrared cameras, laser imagers, millimeter wave cameras, and other image capturing technology now existing or later developed. Sensors 202 are coupled to processing unit 204. The image frame data is transferred from sensors 202 to processing unit 204.

Figure 3:
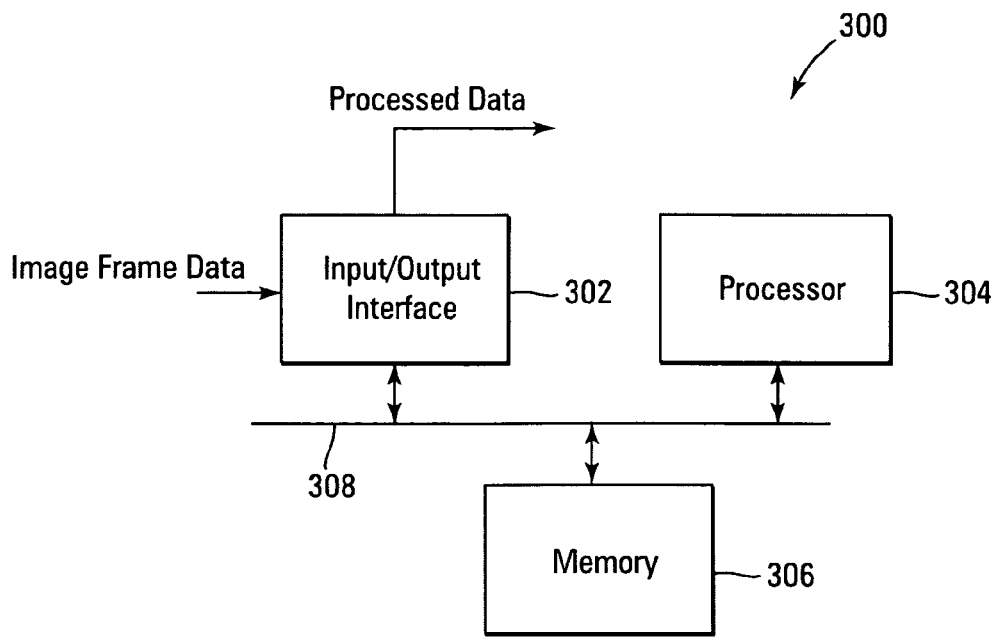
FIG. 3 is a block diagram of an exemplary processing unit for dynamically adjusting and predicting an image segmentation threshold according to one embodiment of the present invention.

In some embodiments, processing unit 204 is implemented through a processor and computer readable instructions, an exemplary embodiment of which is discussed in relation to FIG. 3. In such embodiments, instructions for carrying out the various methods, process tasks, calculations, control functions, and output of data are implemented in software programs, firmware or computer readable instructions. These instructions are typically stored on any appropriate medium used for storage of computer readable instructions such as floppy disks, conventional hard disks, CD-ROM, flash memory ROM, nonvolatile ROM, RAM, and other like medium. In other embodiments, processing unit 204 is implemented through an application specific integrated circuit (ASIC). In such embodiments, circuitry including but not limited to logic gates, counters, flip flops, resistors, capacitors, etc. are used. An exemplary embodiment of an implementation of processing unit 204 through an ASIC is discussed in more detail with regards to FIG. 4.

Processing unit 204 calculates a threshold factor using methods known to one skill in the art. For example, in some embodiments, processing unit 204 selects N regions from the image frame. Processing unit 204 then calculates a mean pixel intensity and standard deviation for each of the N regions. In such embodiments, processing unit 204 calculates a threshold factor by combining an average of the mean pixel intensity for the N regional averages with an average standard deviation for the N regions. Processing unit 204 also calculates an actual average intensity, μ-all, for the entire image frame as a whole and predicts a value of μ-all for future time, t. In some embodiments, the predicted value is based on past actual values of μ-all. Processing unit 204 calculates a final segmentation threshold, $T_f$, by combining the threshold factor with the predicted μ-all. At time t, processing unit 204 segments the image frame corresponding to time t using the final threshold $T_f$.

FIG. 3 is a block diagram of an exemplary processing unit 300 for dynamically adjusting and predicting an image segmentation threshold according to one embodiment of the present invention. Processing unit 300 consists of an input/output interface 302 which receives signals from sensors, as shown in FIG. 2, and outputs processed data. Additionally, in some embodiments input/output interface 302 includes analog-to-digital/digital-to-analog converters (ADC/DAC). The ADC/DAC converts analog input to digital signals for processing by processor 304. In some embodiments, the ADC/DAC also converts the digitally processed data to analog signals for output to a display element or printer.

Processing unit 300 also includes data bus 308 for transporting data to and from the various components of processing unit 300. In some embodiments, data received at input/output interface 302 is directly transferred to processor 304 for processing. In other embodiments, data received is first transferred to memory 306 for storing the data until processed at a later time. In other embodiments, data received is transferred simultaneously to processor 304 and memory 306. Memory 306 includes, but is not limited to, any appropriate medium used for storage such as floppy disks, conventional hard disks, CD-RW, flash memory RAM, RAM, and other like medium.

Processor 304 includes or functions with software programs, firmware or computer readable instructions for carrying out various methods, process tasks, calculations, and control functions for dynamically adjusting and predicting an image segmentation threshold according to embodiments of the present invention. These instructions are typically stored on any appropriate medium used for storage of computer readable instructions such as floppy disks, conventional hard disks, CD-ROM, flash ROM, nonvolatile ROM, RAM, and other like medium. In some embodiments, these instructions are stored on memory 306. Processor 304 also includes or interfaces with hardware components for operation of embodiments of the present invention. By way of example and not by way of limitation, these hardware components include one or more microprocessors, graphics processors, memories, storage devices, interface cards, and other standard components known in the art.

Processor 304 receives image frame data and calculates a threshold factor using methods known to one of skill in the art. For example, in some embodiments, processor 304 calculates a threshold factor by selecting N regions from the image frame, calculating a mean pixel intensity and standard deviation for each of the N regions, and averaging the mean pixel intensities and standard deviations from the N regions. Processor 304 also calculates an actual average pixel intensity, μ-all, for the image frame as a whole and predicts future values of μ-all based on past actual values. In some embodiments, memory 306 stores one or more of past calculated values of t-all, regional means and standard deviations, and past calculated threshold factors. Processor 304 then calculates a segmentation threshold, $T_f$, by combining the threshold factor with a predicted value of μ-all for future time t. Finally, processor 304 segments the image frame at time t with the final segmentation threshold $T_f$.

Figure 4:
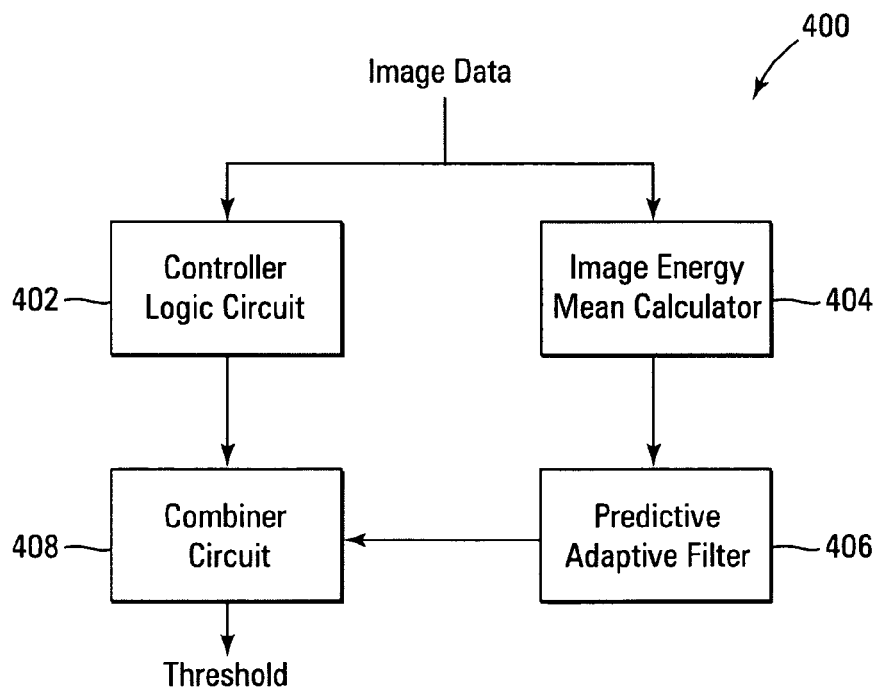
FIG. 4 is a block diagram of an exemplary processing unit for dynamically adjusting and predicting an image segmentation threshold according to one embodiment of the present invention.

FIG. 4 is a block diagram of an exemplary processing unit 400 for dynamically adjusting and predicting an image segmentation threshold according to one embodiment of the present invention. Processing unit 400 is implemented as an ASIC using various circuits to perform necessary functions. The specific components to be used in each functional block to perform the necessary functions are known to one of skill in the art. For example, block 404 calculates an image energy (also referred to herein as pixel intensity) mean for image frame data. In one embodiment, to calculate a mean, block 404 uses a summation circuit. In one embodiment, this summation circuit is made from appropriate resistors and an OR logic gate. The skill of assembling and coupling appropriate components is known to one of skill in the art. Hence, the specific components are not discussed in detail in the present application. The blocks, therefore, represent the general functions needed to implement processing unit 400 in an ASIC.

In the embodiment in FIG. 4, image frame data is received at controller logic circuit 402 and image energy mean calculator 404. Controller logic circuit 402 calculates a threshold factor. In some embodiments, controller logic circuit 402 calculates a threshold factor by selecting N regions from the image frame and calculating a mean pixel intensity and standard deviation for each of the N regions. In such embodiments, controller logic circuit 402 also averages the N regional mean pixel intensities and N regional standard deviations and outputs the averages to combiner circuit 408.

Image energy mean calculator 404 calculates an actual average image pixel intensity for the entire image frame as a whole. The calculated average image pixel intensity is then output to predictive adaptive filter 406. Predictive adaptive filter 406 calculates a predicted average image pixel intensity for a future time t. In some embodiments, predictive adaptive filter 406 calculates a predicted average image pixel intensity based on past actual average image pixel intensities. Additionally, predictive adaptive filter 406 updates filter coefficients by comparing the actual average image pixel intensity for time t, when available (i.e. once current time is time t), with the predicted average image pixel intensity for time t. The filter coefficients are adjusted based on differences between the predicted and actual average image pixel intensities. In some embodiments, a Least Means Squared (LMS) algorithm is used to update the filter coefficients based on the comparison of the predicted and actual average image pixel intensities. In other embodiments, a Recursive Least Squares (RLS) algorithm is used to update the filter coefficients. In yet other embodiments, other means are used for updating the filter coefficients. The predicted average image pixel intensity is output from predictive adaptive filter 406 to combiner circuit 408.

Combiner circuit 408 receives the threshold factor from controller logic circuit 402 and the predicted average image pixel intensity from predictive adaptive filter 406. Combiner circuit 408 combines the threshold factor and the predicted average image pixel intensity to calculate the image segmentation threshold. In some embodiments, combiner circuit 408 combines the threshold factor and the predicted average image pixel intensity be weighting each and summing the weighted threshold factor and the weighted predicted average image pixel intensity. In other embodiments, combiner circuit 408 averages the threshold factor and the predicted average image pixel intensity when combining the threshold factor and the predicted average image pixel intensity. The image segmentation threshold is then output from combiner circuit 408. In some embodiments, combiner circuit 408 outputs the threshold to another processing unit for segmenting the image frame to separate the object being tracked from the background.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of dynamically adjusting and predicting a segmentation threshold in an image based tracking device, the method comprising:
   calculating a threshold factor with a processing unit of the image based tracking device;
   calculating an actual average image pixel intensity for an entire image frame with the processing unit;
   predicting a future average image pixel intensity for future time t with the processing unit, wherein the predicted future average image pixel intensity is based on past actual average image pixel intensities;
   combining, with the processing unit, the predicted future average image pixel intensity with the threshold factor to provide an adaptive threshold that adapts to changes in pixel intensity due to movement of an object in the image frame; and
   updating, with the processing unit, coefficients used in predicting the future average image pixel intensity;
   wherein updating the coefficients used in predicting the future average image pixel intensity further comprises:
   receiving image frame data for time t once available;
   calculating the actual average image pixel intensity at time t;
   comparing the actual average image pixel intensity with the predicted future average image pixel intensity for time t; and
   adjusting the coefficients used in predicting the future average image pixel intensity based on differences between the actual average image pixel intensity and the predicted future average image pixel intensity.

2. The method of claim 1, wherein calculating an actual average image pixel intensity further comprises calculating an actual average image pixel intensity based on one of a grayscale value, RGB component values, and CMYK component values.

3. The method of claim 1, wherein calculating a threshold factor further comprises:
   selecting a plurality of regions of an image frame;
   calculating a regional average pixel intensity and a standard deviation for each of the plurality of regions; and
   averaging the plurality of regional average pixel intensities and the plurality of regional standard deviations.

4. The method of claim 1, wherein combining the predicted future average image pixel intensity with the threshold factor further comprises:
   weighting each of the threshold factor and the predicted future average image pixel intensity; and
   summing the weighted threshold factor and the weighted predicted future average image pixel intensity.

5. An image processing system, the system comprising:
   one or more sensors for gathering image data; and
   a processing unit coupled to the one or more sensors for processing the image data to calculate a dynamic image segmentation threshold by combining a threshold factor with a predicted average image pixel intensity, p-all, for future time t;
   wherein the processing unit further comprises:
   a predictive adaptive filter to calculate the predicted average image pixel intensity for future time t based on past actual average image pixel intensities;
   wherein the predictive adaptive filter updates filter coefficients by comparing the predicted average pixel intensity for future time t with an actual average pixel intensity for time t once the actual average pixel intensity for time t is available and adjusts the filter coefficients based on differences between the predicted and actual average pixel intensity for time t;
   wherein the processing unit receives image data, calculates a threshold factor based on the image data received, and calculates an actual average image pixel intensity for an entire image frame based on the image data received.

6. The image processing system of claim 5, wherein the one or more sensors further comprises one or more of:
   one or more infrared cameras;
   one or more laser imagers; and
   one or more millimeter wave cameras.

7. The image processing system of claim 5, wherein the processing unit further comprises:
   an input/output interface for receiving the image data from the one or more sensors and for outputting processed data; and
   a processor for processing the image data received through the input/output interface, wherein the processor calculates a threshold factor, an actual average image pixel intensity for an entire image frame, and a predicted future average image pixel intensity based on past actual average image pixel intensities, the processor combining the threshold factor and the predicted future average image pixel intensity to calculate an adaptive segmentation threshold.

8. The image processing system of claim 5, wherein the processing unit further comprises:
   a controller logic circuit for receiving image data and calculating the threshold factor based on the image data received;
   a mean calculator for receiving image data and calculating the actual average image pixel intensity for the entire image frame based on the image data received; and
   a combiner circuit coupled to the predictive adaptive filter and the controller logic circuit for receiving the threshold factor and the predicted average image pixel intensity and for combining the threshold factor and the predicted average image pixel intensity.

9. The image processing system of claim 8, wherein the controller logic circuit calculates a threshold factor by selecting image regions, calculates a mean pixel intensity and standard deviation for each selected region, and averages the regional mean pixel intensities and the regional standard deviations.

10. A computer readable medium having computer executable instructions for performing a method of dynamically adjusting and predicting a segmentation threshold, the method comprising:
    receiving image frame data for an image frame;
    calculating a threshold factor based on the image frame data;
    averaging a pixel intensity for substantially all the pixels in the image frame to obtain an actual average pixel intensity for the entire image frame;
    performing a predictive filter algorithm on the image frame data to obtain a predicted future average pixel intensity for the entire image frame at future time t, wherein the predictive filter algorithm uses past actual average pixel intensities to predict the future average pixel intensity;
    combining the threshold factor and the predicted future average pixel intensity for future time t to produce an adaptive segmentation threshold; and providing an output of the adaptive segmentation threshold to a processor for segmenting the image frame data using the adaptive segmentation threshold; and wherein performing the predictive filter algorithm on the image frame data to obtain the predicted future average pixel intensity further comprises:

receiving image frame data for time t;

calculating an actual average pixel intensity for the image frame data for time t;

computing a difference between the actual average pixel intensity for time t and the predicted average pixel intensity for time t; and updating filter coefficients in the predictive filter algorithm based on the computed difference between the actual average pixel intensity for time t and the predicted average pixel intensity for time t.

11. The computer readable medium of claim 10, wherein calculating a threshold factor further comprises:

calculating a mean pixel intensity and standard deviation for each of a plurality of regions selected from the image frame;

averaging the plurality of regional mean pixel intensities;

averaging the plurality of regional standard deviations; and combining the average of the plurality of regional mean pixel intensities and the average of the plurality of regional standard deviations.

12. The computer readable medium of claim 10, wherein combining the threshold factor and the predicted average pixel intensity further comprises one of:

averaging the predicted average pixel intensity and the threshold factor; or weighting each of the predicted average pixel intensity and the threshold factor and adding the weighted predicted average pixel intensity to the weighted threshold factor.

13. The computer readable medium of claim 10, wherein updating filter coefficients further comprises:

updating filter coefficients using a Least Means Squared algorithm to minimize differences in the predicted average pixel intensity and the actual average pixel intensity.

14. An image processing system comprising:

means for collecting image frame data; and means for calculating a threshold factor and a predicted average image pixel intensity coupled to the means for collecting image frame data, wherein a combination of the threshold factor and the predicted average image pixel intensity produces an adaptive segmentation threshold;

wherein the means for calculating a predicted average image pixel intensity further comprises:

means for updating filter coefficients coupled to the means for calculating a predicted average image pixel intensity, wherein the means for updating filter coefficients minimizes error between the predicted average image pixel intensity and an actual average image pixel intensity.

15. The image processing system of claim 14, further comprising:

means for providing an output of the adaptive segmentation threshold to be used in segmenting the image frame data.

* * * * *

UNITED STATES PATENT AND TRADEMARK OFFICE
CERTIFICATE OF CORRECTION

| | | |
|---|---|---|
| PATENT NO. | : 7,653,242 B2 | Page 1 of 1 |
| APPLICATION NO. | : 11/273779 | |
| DATED | : January 26, 2010 | |
| INVENTOR(S) | : Jamal Haque | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,653,242 B2 |
| APPLICATION NO. | : 11/273779 |
| DATED | : January 26, 2010 |
| INVENTOR(S) | : Haque |

It is certified that error appears in the above-identified patent and that said Letters Patent is hereby corrected as shown below:

At Claim 5, Column 7, Line 61, replace "p-all" with --µ-all--

Signed and Sealed this
Twenty-seventh Day of November, 2012

David J. Kappos
*Director of the United States Patent and Trademark Office*